US006997840B2

(12) United States Patent
Stevenson

(10) Patent No.: US 6,997,840 B2
(45) Date of Patent: Feb. 14, 2006

(54) APPARATUS FOR FEEDING OIL TO A CLUTCH

(75) Inventor: Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 132 days.

(21) Appl. No.: 10/784,560

(22) Filed: Feb. 23, 2004

(65) Prior Publication Data

US 2004/0266577 A1 Dec. 30, 2004

Related U.S. Application Data

(60) Provisional application No. 60/480,971, filed on Jun. 24, 2003.

(51) Int. Cl.
*F16H 31/00* (2006.01)

(52) U.S. Cl. ...................................... 475/143; 475/275

(58) Field of Classification Search ................ 475/275, 475/146, 143
See application file for complete search history.

(56) References Cited

U.S. PATENT DOCUMENTS

| | | | | | |
|---|---|---|---|---|---|
| 4,070,927 | A | | 1/1978 | Polak | 74/765 |
| 4,420,992 | A | * | 12/1983 | Windish | 475/118 |
| 4,709,594 | A | | 12/1987 | Maeda | 74/753 |
| 5,106,352 | A | | 4/1992 | Lepelletier | 475/280 |
| 5,599,251 | A | | 2/1997 | Beim et al. | 475/275 |
| 6,053,839 | A | | 4/2000 | Baldwin et al. | 475/281 |
| 6,071,208 | A | | 6/2000 | Koivunen | 475/275 |
| 6,083,135 | A | | 7/2000 | Baldwin et al. | 475/276 |

* cited by examiner

*Primary Examiner*—Dirk Wright
(74) *Attorney, Agent, or Firm*—Christopher DeVries

(57) ABSTRACT

A transmission includes at least one planetary gear set having first, second and third members; a clutch pack connected to one of the members; and a rotatable housing member connected to another one of the members. A piston assembly is supported on the rotatable housing member and rotatable therewith. The piston assembly includes a thrust bearing operatively connected with an axially movable piston to receive an apply force from the piston, and a piston apply member positioned between the thrust bearing and the clutch pack for transmitting the apply force to the clutch pack. Fluid for applying the piston is carried through a stationary support member, through the rotatable housing member, and into the piston assembly.

27 Claims, 3 Drawing Sheets

| GEAR STATE | GEAR RATIO | RATIO STEPS | C1234 (50) CLUTCH<br>PC3(46)<br>S1 | C5 (52) CLUTCH<br>R3<br>S1 | CB27 (54) CLUTCH<br>S2<br>GROUND | C36R (56) CLUTCH<br>PC3(46)<br>S2 | C4567 (58) CLUTCH<br>R3<br>PC1(26) | CB1R (59) CLUTCH<br>PC2(36)<br>GROUND |
|---|---|---|---|---|---|---|---|---|
| Rev | -2.763 | | | | | X | | X |
| N | | -0.59 | | | | | | 0 |
| 1st | 4.713 | | G | | | | | X |
| 2nd | 2.769 | 1.70 | X | | X | | | |
| 3rd | 1.625 | 1.70 | X | | | X | | |
| 4th | 1.153 | 1.41 | X | | | | X | |
| 5th | 1.000 | 1.15 | | X | | | X | |
| 6th | 0.815 | 1.23 | | | | X | X | |
| 7th | 0.630 | 1.30 | | | X | | X | |
| 8th | | | | | | | | |

APPARATUS FOR FEEDING OIL TO A CLUTCH

CROSS-REFERENCE TO RELATED APPLICATION

This application claims the benefit of U.S. Provisional Application 60/480,971, filed Jun. 24, 2003, which is hereby incorporated by reference in its entirety.

TECHNICAL FIELD

The present invention relates to an apparatus for feeding oil to a clutch in a transmission wherein oil is transmitted through a stationary support member, through a rotatable housing which is connected to a member of a planetary gear set, and into a piston which is supported by the rotatable housing.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

Seven-speed transmissions are disclosed in U.S. Pat. No. 4,709,594 to Maeda; U.S. Pat. No. 6,053,839 to Baldwin et. al.; and U.S. Pat. No. 6,083,135 to Baldwin et. al. Seven-speed transmissions provide further improvements in acceleration and fuel economy over six-speed transmissions. However, like the six-speed transmissions discussed above, the development of seven- and eight-speed transmissions has been precluded because of complexity, size and cost. Also, the added complexity of such multi-speed transmissions creates challenges in delivering oil to clutch needed for changing speeds.

SUMMARY OF THE INVENTION

The invention provides an apparatus for delivering oil to a clutch in a transmission, wherein oil is transmitted through a stationary sun gear carrier, through a rotatable housing which is connected to a planet carrier assembly member, and into a piston which is supported by the rototable housing.

More specifically, the invention provides a transmission including at least one planetary gear set having first, second and third members; a clutch pack connected to one of the members; and a rotatable housing member connected to another one of the members. A piston assembly is supported on the rotatable housing member and rotatable therewith. The piston assembly includes a thrust bearing operatively connected with an axially movable piston to receive an apply force from the piston, and a piston apply member positioned between the thrust bearing and the clutch pack for transmitting the apply force to the clutch pack. Fluid for applying the piston is carried through a stationary support member, through the rotatable housing member, and into the piston assembly.

Preferably, the piston apply member is rotatable, and is not rotatably connected to the piston. Also, the thrust bearing is a needle bearing. The first, second and third members are a ring gear, a planet carrier assembly member, and a sun gear, respectively. The ring gear is connected to the clutch pack, and the planet carrier assembly member is connected to the rotatable housing member, which is a rotatable carrier housing member connected to the planet carrier assembly member. The sun gear is non-rotatably supported on the stationary support member, which is a stationary sun gear carrier, and the piston assembly is supported on the carrier housing member and rotatable therewith.

The piston cooperates with a first piston member to form an apply chamber therebetween. The thrust bearing is positioned between the piston and the piston apply member so that the piston apply member and clutch pack may rotate at a different speed than the planet carrier assembly member. Oil for applying the piston is fed through the stationary sun gear carrier and through the carrier housing member to the piston.

Another aspect of the invention provides a multi-speed transmission which includes an input shaft, an output shaft, and a planetary gear arrangement having first, second and third planetary gear sets. Each planetary gear set has first, second and third members. The input shaft is continuously interconnected with the first member of the first planetary gear set, and the output shaft is continuously connected with the first member of the third planetary gear set. The first member of the second planetary gear set is integrally connected with the first member of the third planetary gear set. The third member of the first planetary gear set is continuously connected with a transmission housing. An interconnecting member continuously connects the second member of the second planetary gear set with the second member of the third planetary gear set. A first torque-transmitting mechanism selectively connects the second member of the first planetary gear set with the third member of the third planetary gear set. A second torque-transmitting mechanism (which is embodied as the above-described clutch pack) selectively connects the first member of the first planetary gear set with the third member of the third planetary gear set. A third torque-transmitting mechanism selectively connects the third member of the second planetary gear set with the transmission housing. A fourth torque-transmitting mechanism selectively connects the second member of the first planetary gear set with the third member of the second planetary gear set. A fifth torque-transmitting mechanism selectively connects the first member of the first planetary gear set with the second member of the third planetary gear set. A sixth torque-transmitting mechanism selectively connects the second member of the second planetary gear set with the transmission housing.

The first, second, third, fourth, fifth and sixth torque-transmitting mechanisms are engaged in combinations of two to establish seven forward speed ratios and a reverse speed ratio between the input shaft and the output shaft.

The ring gears of the first and third planetary gear sets may be formed as a single elongated ring gear, or they may be two ring gears interconnected by a sleeve and separated by a spacer and spring member.

The first and second planetary gear sets are simple planetary gear sets, and the third planetary gear set is a compound planetary gear set.

The first, second, fourth and fifth torque-transmitting mechanisms are rotating clutches, and the third and sixth torque-transmitting mechanisms are brakes.

The above features and other features and advantages of the present invention are readily apparent from the following detailed description of the best modes for carrying out the invention when taken in connection with the accompanying drawings.

DESCRIPTION OF THE PREFERRED EMBODIMENT

Figure 1:
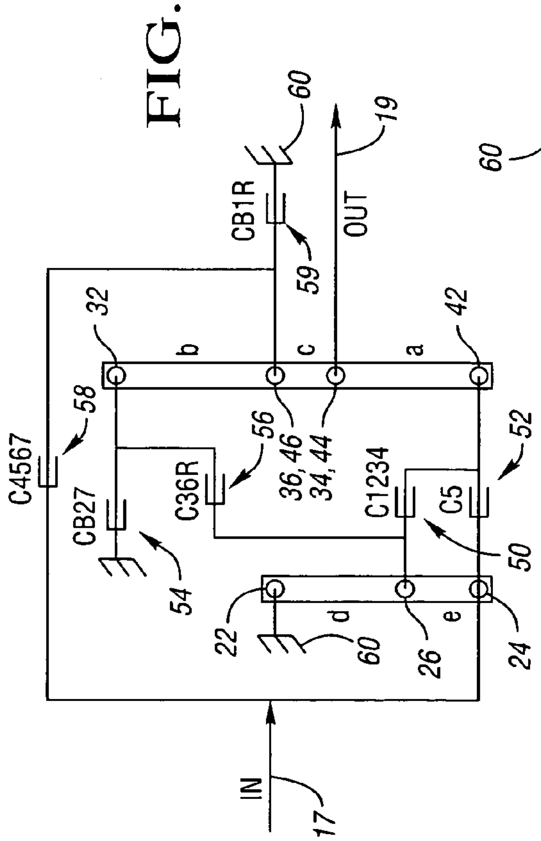
FIG. 1 shows a lever diagram of a transmission in accordance with the invention.

FIG. 1 shows a lever diagram of a transmission in accordance with the invention. The mechanisms will be described with specific reference to the stick diagram of FIG. 2, wherein like reference numerals refer to like components from FIG. 1.

Figure 2:
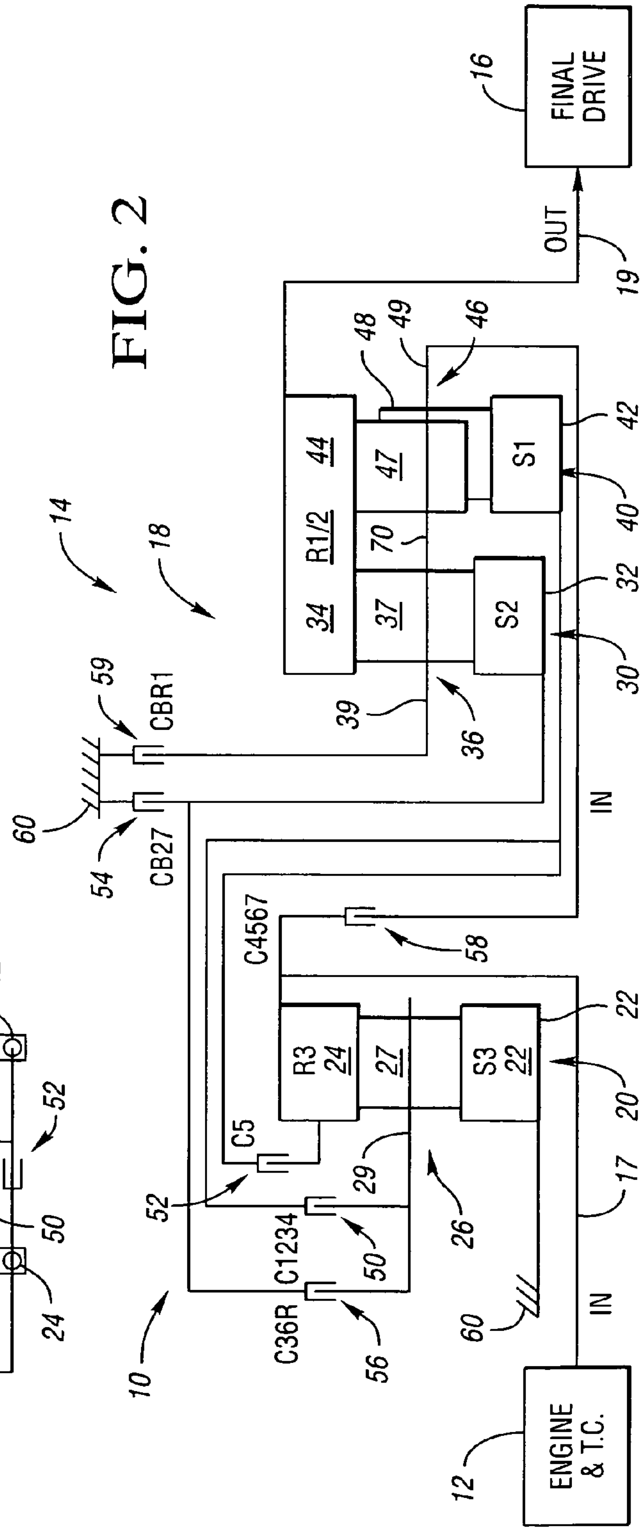
FIG. 2 shows a stick diagram corresponding with the lever diagram of FIG. 1.

Referring to FIG. 2, there is shown a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 (the first planetary gear set) includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 (the second planetary gear set) includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 (the third planetary gear set) includes a sun gear member 42, a ring gear member 44, and a planet carrier assembly member 46. The ring gear member 44 is integrally formed with the ring gear member 34. In other words, the ring gear members 34, 44 are formed by a single elongated ring gear member. The planet carrier assembly member 46 includes a plurality of pinion gears 47, 48 rotatably mounted on a carrier member 49. The pinion gears 47 are disposed in meshing relationship with the ring gear member 44, and the pinion gears 48 are disposed in meshing relationship with the sun gear member 42. The pinion gears 47, 48 also mesh with eachother.

The planetary gear arrangement 18 also includes six torque-transmitting mechanisms 50, 52, 54, 56, 58, 59. The torque-transmitting mechanisms 50, 52, 56, 58 are rotating torque-transmitting mechanisms, commonly termed clutches. The torque-transmitting mechanisms 54, 59 are stationary type torque-transmitting mechanisms, commonly termed brakes or reaction clutches.

The input shaft 17 is continuously connected with the ring gear member 24, and the output shaft 19 is continuously connected with the ring gear member 44. An interconnecting member 70 continuously interconnects the planet carrier assembly member 36 with the planet carrier assembly member 46. The sun gear member 22 is continuously connected with the transmission housing 60.

The planet carrier assembly member 26 is selectively connectable with the sun gear member 42 through the clutch 50. The ring gear member 24 is selectively connectable with the sun gear member 42 through the clutch 52. The sun gear member 32 is selectively connectable with the transmission housing 60 through the brake 54. The planet carrier assembly member 26 is selectively connectable with the sun gear member 32 through the clutch 56. The ring gear member 24 is selectively connectable with the planet carrier assembly member 46 through the clutch 58. The planet carrier assembly member 36 is selectively connectable with the transmission housing 60 through the clutch 59.

The appended claims refer to first, second and third members, which are the ring gear member, planet carrier assembly member, and sun gear member of the gear sets, respectively, in the preferred embodiment.

Figures 3, 4:
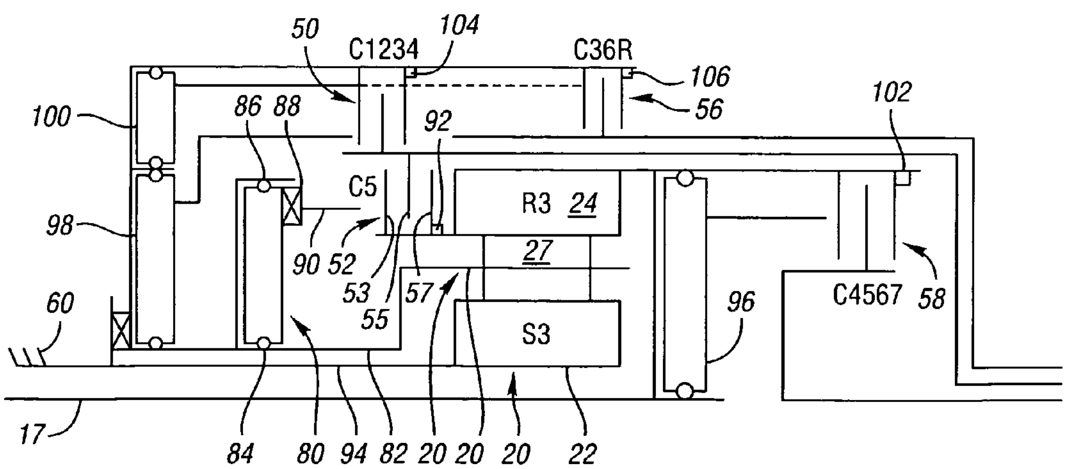
FIG. 3 shows a Truth Table for use with the transmission of FIGS. 1 and 2.
FIG. 4 is a schematic diagram illustrating the implementation of pistons in a portion of the stick diagram of FIG. 2.

As shown in the truth table (i.e., clutching table) of FIG. 3, the torque-transmitting mechanisms 50, 52, 54, 56, 58, 59 are selectively engaged in combinations of two to provide seven forward speed ratios and one reverse speed ratio. It should also be noted in the truth table that the torque-transmitting mechanism 59 remains engaged through the neutral condition, thereby simplifying the forward/reverse interchange.

To establish the reverse speed ratio, the clutch 56 and brake 59 are engaged. The clutch 56 connects the planet carrier assembly member 26 with the sun gear member 32, and the brake 59 connects the planet carrier assembly member 36 with the transmission housing 60. As illustrated in the truth table, the overall numerical value of the reverse speed ratio is −2.763.

The first forward speed ratio is established with the engagement of the clutch 50 and the brake 59. The clutch 50 connects the planet carrier assembly member 26 with the sun gear member 42, and the brake 59 connects the planet carrier assembly member 36 with the transmission housing 60. The overall numerical value of the first forward speed ratio is 4.713, as indicated in the truth table.

The second forward speed ratio is established with the engagement of the clutch 50 and brake 54. The clutch 50 connects the planet carrier assembly member 26 with the sun gear member 42, and the brake 54 connects the sun gear member 32 with the transmission housing 60. The overall numerical value of the second forward speed ratio is 2.769, as indicated in the truth table.

The third forward speed ratio is established with the engagement of the clutches 50, 56. The clutch 50 connects the planet carrier assembly member 26 with the sun gear member 42, and the clutch 56 connects the planet carrier assembly member 26 with the sun gear member 32. The overall numerical value of the third forward speed ratio is 1.625, as indicated in the truth table.

The fourth forward speed ratio is established with the engagement of the clutches 50, 58. Again, the clutch 50 connects the planet carrier assembly member 26 with the sun gear member 42, and the clutch 58 connects the ring gear member 24 with the planet carrier assembly member 46. The overall numerical value of the fourth forward speed ratio is 1.153, as indicated in the truth table.

The fifth forward speed ratio is established with the engagement of the clutches 52, 58. The clutch 52 connects the ring gear member 24 with the sun gear member 42, and the clutch 58 connects the ring gear member 24 with the planet carrier assembly member 46. In this configuration, the input shaft 17 is directly connected to the output shaft 19, so the overall numerical value of the fifth forward speed ratio is 1, as indicated in the truth table.

The sixth forward speed ratio is established with the engagement of the clutches 56, 58. The clutch 56 connects the planet carrier assembly member 26 with the sun gear member 32, and the clutch 58 connects the ring gear member 24 with the planet carrier assembly member 46. The overall numerical value of the sixth forward speed ratio is 0.815, as indicated in the truth table.

The seventh forward speed ratio is established with the engagement of the brake 54 and clutch 58. The brake 54 connects the sun gear member 32 with the transmission housing 60, and the clutch 58 connects the ring gear member 24 with the planet carrier assembly member 46. The numerical value of the seventh forward speed ratio is 0.630, as indicated in the truth table.

As set forth above, the engagement schedules for the torque-transmitting mechanisms are shown in the truth table of FIG. 3. This truth table also provides an example of speed ratios that are available utilizing the following ring gear/sun gear tooth ratios: the ring gear/sun gear tooth ratio of the planetary gear set 40 is 2.90; the ring gear/sun gear tooth ratio of the planetary gear set 30 is 1.70; and the ring gear/sun gear tooth ratio of the planetary gear set 20 is 1.60. Also, the truth table of FIG. 3 describes the ratio steps that can be attained utilizing the sample of tooth ratios given. For example, the step ratio between the first and second forward ratios is 1.70, while the step ratio between the reverse and first forward ratio is −0.59. It can also be readily determined from the truth table of FIG. 3 that all of the single step forward ratio interchanges are of the single transition variety.

Referring to FIG. 4, a schematic diagram is shown illustrating the position of the pistons for applying the clutches 50, 52, 56, 58 illustrated in FIG. 2. With the clutch 52 and its corresponding piston located as shown in FIG. 4, easy access is provided to the piston for feeding oil to the piston without the need to bypass another piston in the oil path. With the clutch 52 positioned at the left side of the planetary gear set 20 as shown in FIGS. 2 and 4, the piston assembly 80 is advantageously positioned on the carrier housing member 82 and rotates therewith. The piston assembly 80 includes seals 84, 86, and a thrust bearing 88 which transfers apply force to the piston apply member 90. The piston apply member 90 applies the clamping force to the clutch pack 52, which is compressed against the snap ring 92.

Accordingly, the rotating piston assembly 80 applies force through the piston apply member 90 to the clutch plates 53, 55, 57. The piston apply member 90 is rotatable at a different speed than the piston assembly 80 and the clutch pack 52 as a result of the thrust bearing 88.

The clutch oil and dam oil are carried to the carrier member 82 through the sun gear carrier 94, which is grounded to the transmission housing 60. Accordingly, only three seals would be needed for transferring the clutch oil and dam oil from the transmission housing into the piston through the carrier housing member 82.

FIG. 4 also illustrates the pistons 96, 98, 100 for applying the clutch packs 58, 50, 56, respectively. As shown, these clutch packs 58, 50, 56 are each positioned adjacent a respective snap ring 102, 104, 106.

Figure 5:
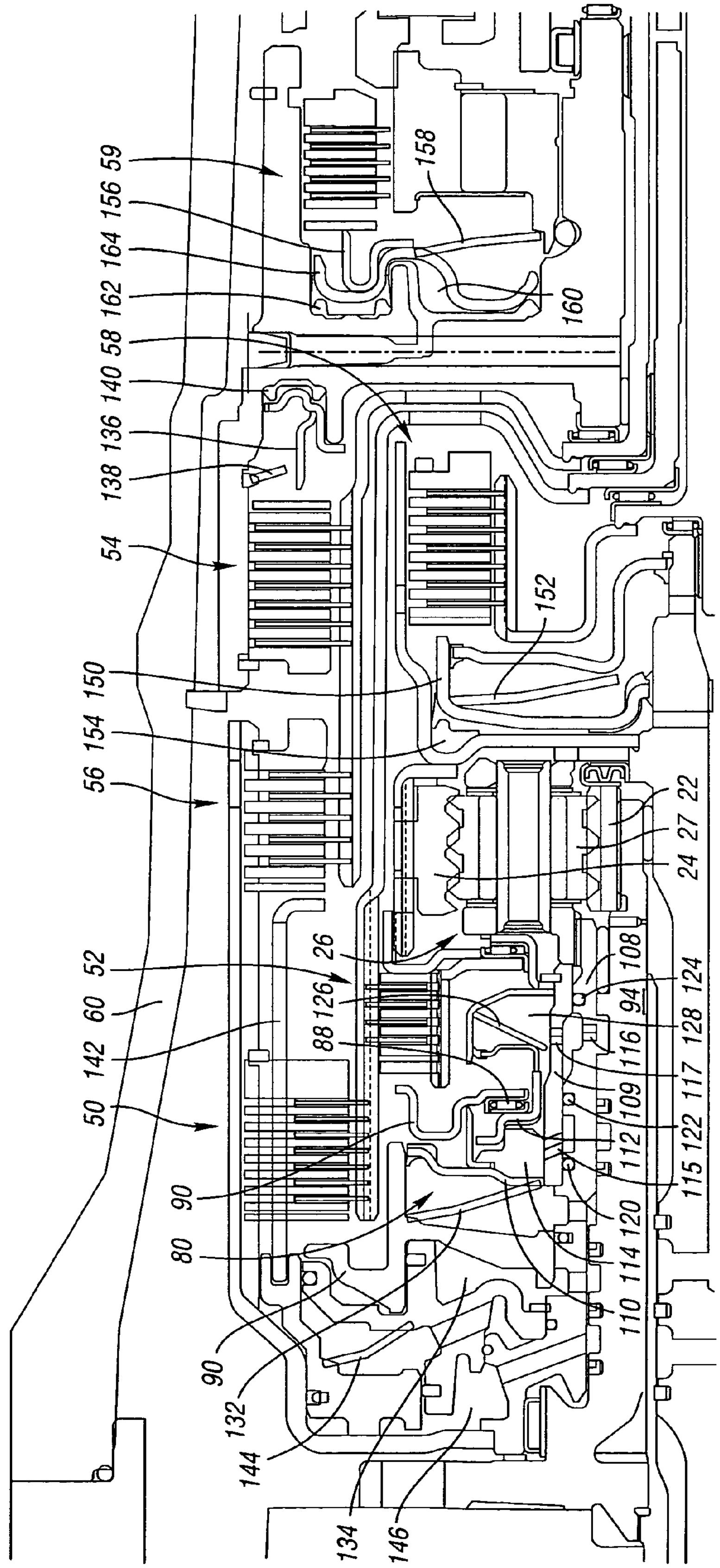
FIG. 5 is a partial longitudinal cross-sectional view of a transmission incorporating the piston arrangement illustrated in FIG. 4.

FIG. 5 shows a schematic partial longitudinal cross-sectional illustration of a transmission implementing the piston arrangement described with respect to FIG. 4. Like reference numerals are used in FIG. 5 to describe like components from FIGS. 1–4. FIG. 5 illustrates the novel apparatus which delivers oil to the piston assembly 80.

As shown in FIG. 5, the piston assembly 80 includes a piston housing member 109 which is supported on the rotatable carrier housing member 108 for rotation therewith. The rotatable carrier housing member 108 is connected to the planet carrier assembly member 26, and is rotatably supported on the sun gear carrier 94, which is non-rotatably fixed to the transmission housing 60. The piston assembly 80 includes first and second piston members 110, 112 (wherein the second piston member 112 is a "piston") with an apply chamber 114 therebetween filled with apply fluid. The first piston member 110 is axially stationary, and the second piston member 112 is an axially movable piston. The apply fluid is fed from channels in the sun gear carrier 94 through the channel 115 of the piston housing member 109 into the apply chamber 114 of the piston assembly 80. Balance dam fluid flows from the channels of the sun gear carrier 94 through the channels 116 and 117 into the balance dam chamber 128. A return spring 126 is also positioned in the balance dam chamber 128. Seals 120, 122, 124 seal the channels 115, 116, 117.

A needle bearing 88 is positioned between the piston apply member 90 and the second piston member 112 (i.e., the movable piston) so that the piston apply member 90 may rotate at a different speed than the second piston member (a.k.a. the piston) 112. The spring 126 biases the second piston member (a.k.a. the piston) 112 toward the non-applied position.

As shown in FIG. 5, the clutch 50 is applied by the piston 90 against the force of the return spring 132 when fluid is forced into the apply chamber 134. The clutch 52 is applied by the apply member 90, as described above. The brake 54 is applied by the piston 136 against the force of the return spring 138 when fluid is forced into the apply chamber 140. The clutch 56 is applied by the castellated piston apply member 142 against the force of the return spring 144 when fluid is forced into the apply chamber 146. The clutch 58 is applied by the piston 150 against the force of the return spring 152 when fluid is forced into the apply chamber 154 to move the piston 150. The brake 59 is applied by the piston apply member 156 against the force of the return spring 158 when fluid is forced into the apply chamber 162 to move the piston 164.

While the best mode for carrying out the invention has been described in detail, those familiar with the art to which this invention relates will recognize various alternative designs and embodiments for practicing the invention within the scope of the appended claims.

What is claimed is:

1. A transmission comprising:

at least one planetary gear set having first, second and third members;

a clutch pack connected to one of said members;

a rotatable housing member connected to another one of said members;

a piston assembly supported on said rotatable housing member and rotatable therewith; said piston assembly including a thrust bearing operatively connected with an axially movable piston to receive an apply force from the piston, and a piston apply member positioned between said thrust bearing and said clutch pack for transmitting the apply force to the clutch pack; and wherein fluid for applying said piston is carried through a stationary support member, through said rotatable housing member, and into the piston assembly.

2. The transmission of claim 1, wherein said piston apply member is rotatable, and is not rotatably connected to said piston.

3. The transmission of claim 1, wherein said thrust bearing comprises a needle bearing.

4. The transmission of claim 1, wherein said first, second and third members comprise a ring gear, a planet carrier assembly member, and a sun gear, respectively; said one of said members connected to the clutch pack is the ring gear, and said another one of said members connected to the rotatable housing member is the planet carrier assembly member; and said rotatable housing member is a rotatable carrier housing member connected to said planet carrier assembly member.

5. The transmission of claim 4, wherein said sun gear is non-rotatably supported on said stationary support member, which is a stationary sun gear carrier, and said piston assembly is supported on said carrier housing member and rotatable therewith.

6. The transmission of claim 5, wherein said piston cooperates with a first piston member to form an apply chamber therebetween.

7. The transmission of claim 6, wherein said thrust bearing is positioned between the piston and the piston apply member so that the piston apply member and clutch pack may rotate at a different speed than the planet carrier assembly member.

8. The transmission of claim 5, wherein oil for applying said piston is fed through said stationary sun gear carrier and through said carrier housing member to said piston.

9. A multi-speed transmission comprising:

an input shaft;

an output shaft;

a planetary gear arrangement having first, second and third planetary gear sets, each planetary gear set having first, second and third members;

said input shaft being continuously interconnected with said first member of said first planetary gear set, and said output shaft being continuously interconnected with said first member of said third planetary gear set;

said first member of said second planetary gear set being integrally connected with said first member of said third planetary gear set; and said third member of said first planetary gear set being continuously connected with a transmission housing;

an interconnecting member continuously interconnecting said second member of said second planetary gear set with said second member of said third planetary gear set;

a first torque-transmitting mechanism selectively interconnecting said second member of said first planetary gear set with said third member of said third planetary gear set;

a second torque-transmitting mechanism selectively interconnecting said first member of said first planetary gear set with said third member of said third planetary gear set;

a third torque-transmitting mechanism selectively interconnecting said third member of said second planetary gear set with said transmission housing;

a fourth torque-transmitting mechanism selectively interconnecting said second member of said first planetary gear set with said third member of said second planetary gear set;

a fifth torque-transmitting mechanism selectively interconnecting said first member of said first planetary gear set with said second member of said third planetary gear set;

a sixth torque-transmitting mechanism selectively interconnecting said second member of said second planetary gear set with said transmission housing;

a clutch pack connected to one of said members of said first planetary gear set; a rotatable housing member connected to another one of said members of said first planetary gear set; a piston assembly supported on said rotatable housing member and rotatable therewith; said piston assembly including a thrust bearing operatively connected with a piston to receive an apply force from the piston, and a piston apply member positioned between said thrust bearing and said clutch pack for transmitting the apply force to the clutch pack; wherein fluid for applying said piston is carried through a stationary support member, through said rotatable housing member, and into the piston assembly; and said first, second, third, fourth, fifth and sixth torque-transmitting mechanisms being engaged in combinations of two to establish seven forward speed ratios and a reverse speed ratio between said input shaft and said output shaft.

10. The transmission of claim 9, wherein said first member of said second planetary gear set and said first member of said third planetary gear set comprise a single elongated ring gear.

11. The transmission of claim 9, wherein said first and second planetary gear sets are simple planetary gear sets, and said third planetary gear set is a compound planetary gear set.

12. The transmission of claim 9, wherein each of said first members is a ring gear, each of said second members is a planet carrier assembly member, and each of said third members is a sun gear.

13. The transmission housing of claim 9, wherein said first, second, fourth and fifth torque-transmitting mechanisms comprise rotating clutches, and said third and sixth torque-transmitting mechanisms comprise brakes.

14. The transmission of claim 9, wherein said first member of said second planetary gear set and said first member of said third planetary gear set comprise ring gears which are integrally connected by being splined to a common sleeve.

15. The transmission of claim 9, wherein said second torque-transmitting mechanism is positioned at a location which is not between said first, second and third planetary gear sets.

16. The transmission of claim 9, wherein said first, second and third members comprise a ring gear, a planet carrier assembly member, and a sun gear, respectively, and said one of said members connected to the clutch pack is the ring gear of the first planetary gear set, and said another one of said members connected to the rotatable housing member is the planet carrier assembly member of the first planetary gear set.

17. The transmission of claim 16, wherein said sun gear of said first planetary gear set is non-rotatably supported on said stationary support member, which is a stationary sun gear carrier; said rotatable housing member is a carrier housing member connected to said planet carrier assembly member of said first planetary gear set; and said piston is supported on said carrier housing member and rotatable therewith.

18. The transmission of claim 17, wherein said piston cooperates with a first piston member to form an apply chamber therebetween.

19. The transmission of claim 18, wherein said thrust bearing is positioned between the piston and the piston apply member so that the piston apply member and clutch pack may rotate at a different speed than the planet carrier assembly member of the first planetary gear set.

20. The transmission of claim 17, wherein oil for applying said piston is fed through said stationary sun gear carrier and through said carrier housing member to said piston.

21. A multi-speed transmission comprising:

an input shaft;

an output shaft;

a planetary gear arrangement having first, second and third planetary gear sets, each planetary gear set having a ring gear, a planet carrier assembly member, and a sun gear;

said input shaft being continuously interconnected with said ring gear of said first planetary gear set, and said output shaft being continuously interconnected with said ring gear of said third planetary gear set;

said ring gear of said second planetary gear set being integrally connected with said ring gear of said third planetary gear set; and said sun gear of said first planetary gear set being continuously connected with a transmission housing;

an interconnecting member continuously interconnecting said planet carrier assembly member of said second planetary gear set with said planet carrier assembly member of said third planetary gear set;

a clutch pack connected to one of said members of said first planetary gear set; a rotatable housing member connected to another one of said members of said first planetary gear set; a piston supported on said rotatable housing member and rotatable therewith; a thrust bearing operatively connected with the piston to receive an apply force from the piston; and a piston apply member positioned between said thrust bearing and said clutch pack for transmitting the apply force to the clutch pack; wherein fluid for applying said piston is carried through a stationary support member, through said rotatable housing member to the piston; and six torque-transmitting mechanisms selectively engaging said members of said planetary gear sets with other members or with said transmission housing, said six torque-transmitting mechanisms being engaged in combinations of two to establish seven forward speed ratios and a reverse speed ratio between said input shaft and said output shaft.

22. The transmission of claim 21, wherein said first, second and third members comprise a ring gear, a planet carrier assembly member, and a sun gear, respectively, and said one of said members connected to the clutch pack is the ring gear of the first planetary gear set, and said another one of said members connected to the rotatable housing member is the planet carrier assembly member of the first planetary gear set.

23. The transmission of claim 22, wherein said sun gear of the first planetary gear set is non-rotatably supported on said stationary support member, which is a stationary sun gear carrier; and said rotatable housing member is a carrier housing member connected to said planet carrier assembly member of the first planetary gear set.

24. The transmission of claim 23, wherein said piston cooperates with a first piston member to form an apply chamber therebetween.

25. The transmission of claim 24, wherein said thrust bearing is positioned between the piston and the piston apply member so that the piston apply member and clutch pack may rotate at a different speed than the planet carrier assembly member of the first planetary gear set.

26. The transmission of claim 23, wherein oil for applying said piston is fed through said stationary sun gear carrier and through said carrier housing member to said piston.

27. A multi-speed transmission comprising:

an input shaft;

an output shaft;

a planetary gear arrangement having first, second and third planetary gear sets, each planetary gear set having a ring gear, a planet carrier assembly member, and a sun gear;

wherein said second planetary gear set is a simple planetary gear set, and said third planetary gear set is a compound planetary gear set;

said input shaft being continuously interconnected with said ring gear of said first planetary gear set, and said output shaft being continuously interconnected with said ring gear of said third planetary gear set;

said ring gear of said second planetary gear set being integrally connected with said ring gear of said third planetary gear set; and said sun gear of said first planetary gear set being continuously connected with a transmission housing;

wherein said ring gear of said second planetary gear set and said ring gear of said third planetary gear set are integrally connected by being both splined to a sleeve, and a spacer and spring member are positioned between said ring gear of said second planetary gear set and said ring gear of said third planetary gear set;

an interconnecting member continuously interconnecting said planet carrier assembly member of said second planetary gear set with said planet carrier assembly member of said third planetary gear set;

a first torque-transmitting mechanism selectively interconnecting said planet carrier assembly member of said first planetary gear set with said sun gear of said third planetary gear set;

a second torque-transmitting mechanism selectively interconnecting said ring gear of said first planetary gear set with said sun gear of said third planetary gear set, wherein said second torque-transmitting mechanism is positioned between said first and second planetary gear sets;

a third torque-transmitting mechanism selectively interconnecting said sun gear of said second planetary gear set with said transmission housing;

a fourth torque-transmitting mechanism selectively interconnecting said planet carrier assembly member of said first planetary gear set with said sun gear of said second planetary gear set;

a fifth torque-transmitting mechanism selectively interconnecting said ring gear of said first planetary gear set with said planet carrier assembly member of said third planetary gear set;

a sixth torque-transmitting mechanism selectively interconnecting said planet carrier assembly member of said second planetary gear set with said transmission housing;

a clutch pack connected to said ring gear of said first planetary gear set; a rotatable carrier housing member fixed to said planet carrier assembly member of said first planetary gear set; a piston supported on said rotatable carrier housing member and rotatable therewith; a thrust bearing operatively connected with the piston to receive an apply force from the piston; and a piston apply member positioned between said thrust bearing and said clutch pack for transmitting the apply force to the clutch pack; wherein fluid for applying said piston is carried through a stationary support member which supports said sun gear of said first planetary gear set, through said rotatable carrier housing member, and to the piston; and said first, second, third, fourth, fifth and sixth torque-transmitting mechanisms being engaged in combinations of two to establish seven forward speed ratios and a reverse speed ratio between said input shaft and said output shaft.

* * * * *